US00RE42564E

(19) United States
(12) Reissued Patent
Cavalheiro

(10) Patent Number: US RE42,564 E
(45) Date of Reissued Patent: Jul. 26, 2011

(54) BROOM WITH HANDLE OPENING IN THE HEAD THEREOF

(75) Inventor: Flavio Cavalheiro, Nyack, NY (US)

(73) Assignee: Casabella Holdings, LLC, Congers, NY (US)

(21) Appl. No.: 11/122,212

(22) Filed: May 5, 2005

Related U.S. Patent Documents

Reissue of:
(64) Patent No.: 6,598,257
Issued: Jul. 29, 2003
Appl. No.: 09/757,757
Filed: Jan. 10, 2001

(51) Int. Cl.
*A46B 5/02* (2006.01)
*A46B 15/00* (2006.01)

(52) U.S. Cl. ..... 15/159.1; 15/143.1; 15/171; D4/129; D32/50

(58) Field of Classification Search ..... 15/143.1, 15/159.1, 171; D4/129, 130, 132, 135, 138; D32/50, 51
See application file for complete search history.

(56) References Cited

U.S. PATENT DOCUMENTS 634,617 A * 10/1899 Hansen ..... 15/144.1
2,648,860 A * 8/1953 Le Febvre ..... 15/171
3,111,699 A * 11/1963 Comeau ..... 15/159.1
4,385,411 A * 5/1983 Clark ..... 15/160
D286,697 S * 11/1986 Marttinen ..... D32/74
4,654,921 A * 4/1987 Dinner ..... 15/167.1
D293,165 S * 12/1987 Machacek ..... D4/135
4,756,039 A * 7/1988 Pardo ..... 15/160
D300,584 S * 4/1989 Sartori ..... D4/132
D315,451 S * 3/1991 Lapin ..... D4/199
5,010,616 A * 4/1991 Berti ..... 15/159.1
D321,793 S * 11/1991 Bryant ..... D4/135
5,138,737 A * 8/1992 Thomas ..... 15/143.1
D359,853 S * 7/1995 Haug ..... D4/132
D367,175 S * 2/1996 Teufel et al. ..... D4/132
D368,164 S * 3/1996 Reeder ..... D4/199
5,511,273 A * 4/1996 Carroll ..... 15/105
5,517,710 A * 5/1996 Hisey ..... 15/106
D371,003 S * 6/1996 Wolfenden ..... D4/135
5,799,360 A * 9/1998 Vosbikian ..... 15/257.2
5,809,604 A * 9/1998 Olstyn ..... 15/111

FOREIGN PATENT DOCUMENTS

CH 155404 * 9/1932
GB 2237984 * 5/1991

* cited by examiner

*Primary Examiner* — Mark Spisich
(74) *Attorney, Agent, or Firm* — Curtis, Mallet-Prevost, Colt & Mosle LLP

(57) ABSTRACT

A broom with a broom head has flared out bristles projecting therefrom so as to form a leading edge for reaching into confined spaces. The broom head has an opening therethrough to define an integral handle to better control the leading edge and the broomstick is angled away from the leading edge to facilitate entry into confined spaces.

21 Claims, 2 Drawing Sheets

BROOM WITH HANDLE OPENING IN THE HEAD THEREOF

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to bristle brooms and particularly to a broom base for a long handled broom, or the combination of a long handle broom and a broom base. In this context and as used herein, the term "broom base" includes a broom head, means for securing a broomstick to the broom head, and a downwardly extending brush such as a plurality of bristles.

2. Description of the Prior Art

Brooms are generally well known. They may be sewn together broom corn as in a traditional broom or synthetic bristles secured into a broom base with an adhesive or with the broom base material itself e.g. plastic molded around the upper bristle ends.

Generally speaking broom bases do not have any openings there through, that is broom bases are of solid, imperforate construction with only a means for securing a broomstick thereto.

However there are some examples in the prior art of broom bases with an opening, usually to form a handle. U.S. Design Pat. No. 359,853 to Haug discloses a broom with a base broomstick socket at one side of the broom base to hold a broomstick in a position where the broomstick is angled to pass over the vertical centerline of the broom base, thus forming an acute angle thereto. Within that acute angle is a handle means in the form of an angled brace or strut.

U.S. Pat. No. 5,517,710 to Hisey discloses a multipurpose broom having a forming an acute angle thereto. Within that acute angle is a handle means in the form of an angled brace or strut broomstick which extends generally perpendicular to the sweeping surface and a hollow portion in the broom base to receive an auxiliary dusting brush. That hollow portion has a lateral opening through both its side walls so as to form an opening through the broom base which could be used as an handle. However that handle is not readily accessible or comfortable to use since the broomstick is closely positioned nearby.

U.S. Pat. No. 5,799,360 to Vosbikian is similar to the Hisey patent discussed above because it also has a hollow portion but that hollow portion is used to receive a folded dustpan. Like Hisey, Vosbildan's broomstick extends perpendicular to the broom's sweeping surface so that a lateral opening through the sidewalls of the hollow portion forms a handle, which is difficult and uncomfortable to use.

OBJECTS AND SUMMARY OF THE INVENTION

As previously stated the term "broom base" includes the broom head, means for securing a broomstick thereto, and a downwardly extending brush, such as bristles. The broom head of the present invention has an opening there through which is near one edge of the broom head so as to define a narrow area which acts as a comfortable handle which is an integral portion of the broom head. The broom head is preferably made of a moldable material, such as plastic. This handle may be gripped by a user to assist in getting into a small area such as a corner.

The broom head has an off-center broomstick mounting means on its top portion to which a broomstick may be attached, either permanently or detachably. The broom head has a preferably planar lower edge from which the bristles project preferably flared outwardly toward the leading and trailing edges of the broom. The broomstick mounting means results in the broomstick being preferably angled away from the leading edge at an angle of 60 to 85 degrees with respect to the above-mentioned lower edge, thus facilitating insertion of the leading edge of the bristles into a confined space such as a corner.

Unlike the prior art broom bases discussed above, the angle of the broomstick is away from the vertical center line of the broom base. Thus the combination of the off-center location for the broomstick mounting means and the angle thereof results in the broomstick being well clear of the area where a user would be if the user were attempting to force the bristles into a room comer.

The above-mentioned handle on the broom head is not under nor is access thereto impaired. The present handle is instead on the opposite side from the off-center broomstick attachment means. Thus it is very convenient for a user to be positioned between the broom head handle and the broomstick so that the handle can be gripped with one hand and the broomstick gripped with the other hand.

It is therefore an object of the present invention is to provide a broom base with bristles, which can be very conveniently used to reach into confined spaces such as room corners.

Another object of the present invention is to provide a broom having a handle on the broom head, which can be used to maneuver the broom head into confined spaces.

A further object of the present invention is to provide a broom head having a handle thereon which can be gripped by one hand of the user while the broomstick is gripped by the user's other hand.

BRIEF DESCRIPTION OF THE DRAWINGS

Although a preferred embodiment is illustrated, numerous modifications and variations are possible in light of the present teachings. It is therefore to be understood that within the scope of the appended claims the invention may be practiced other than as specifically described herein. Referring now to the drawings.

DETAILED DESCRIPTION OF THE PREFERRED EMBODIMENT

Figure 1:
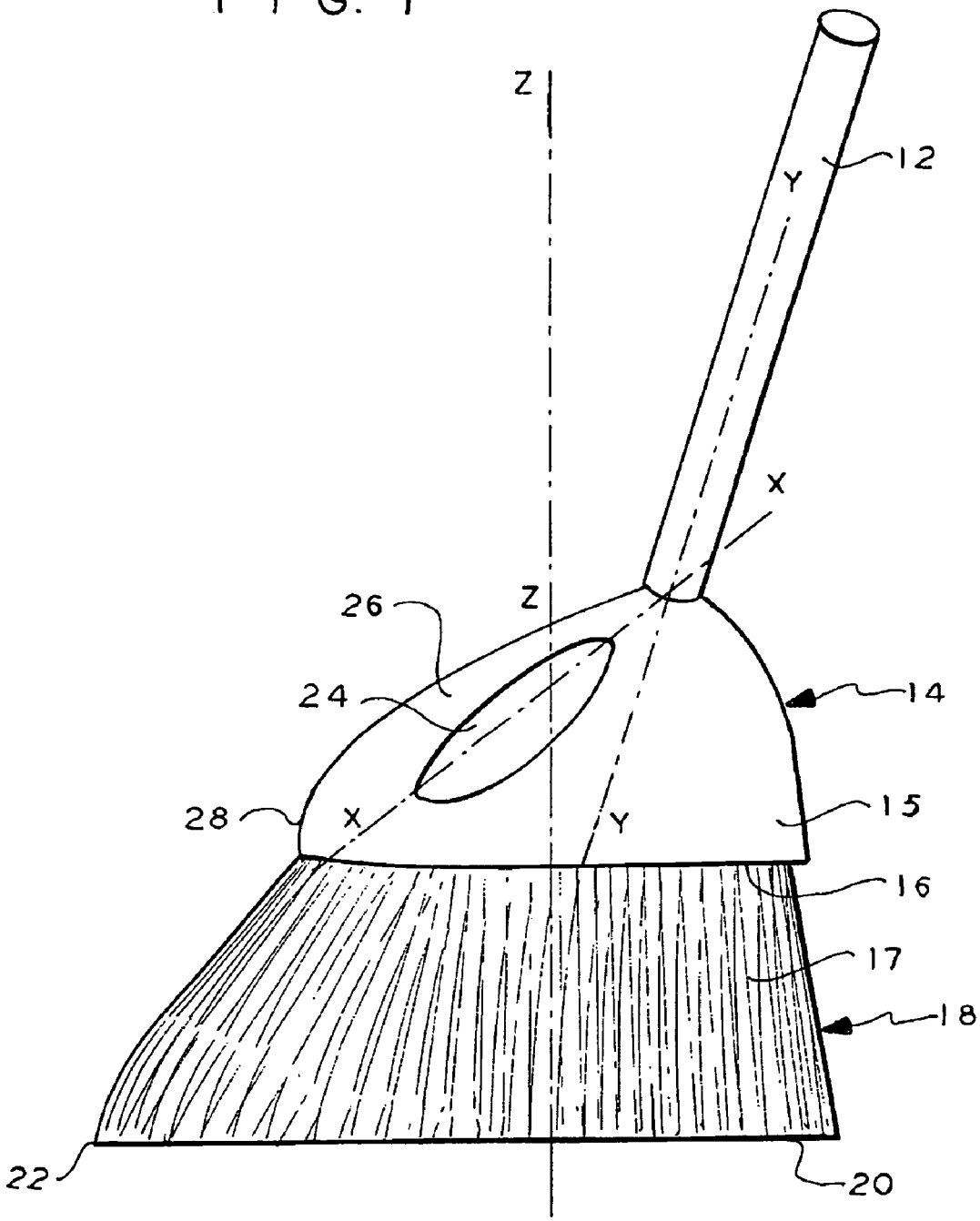
FIG. 1 is a front elevation of the broom base of the present invention; an attached broomstick is also shown.
Figure 3:
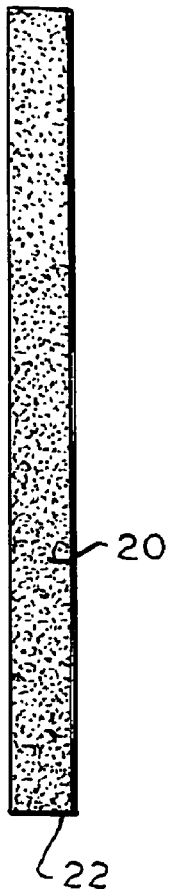
FIG. 3 is a bottom view of the broom base shown in FIG. 1.

In the attached drawings like referenced numerals represent identical or corresponding parts throughout the several views. Referring to FIG. 1 in particular, numeral 12 identifies the broomstick which is shown for the sake of better understanding and which may be of any conventional type: wood, metal, or plastic and about one inch in diameter. The broomstick may be straight or a special double curved handle as disclosed in assignee's above referenced co-pending U.S. patent application.

Figure 2:
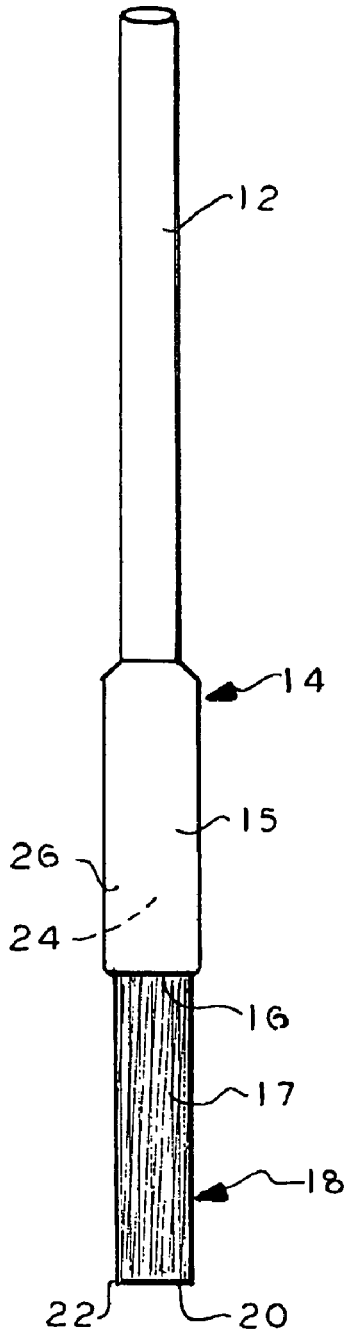
FIG. 2 is a side elevation of broom base of FIG. 1;.

The broomstick is permanently or detachably secured to a broom base 14 which includes a broom head 15 and a broom brush 18. The broom head is preferably made of a molded plastic material so that the nylon bristles 17 may be permanently molded therein. The lower edge 16 of sweeping surface 20 defined by the ends of the bristles 17. The bristles are preferably flared out toward the leading and trailing ends thereof so that the length of the sweeping surface 20 is about 50 percent longer than the length of the lower edge 16. As shown in FIG. 2, the bristles 17 are preferably not flared out in the direction of the thickness of the broom.

The flaring out of the bristles results in the desirable characteristic of the tip 22 of the longest bristles extending out well past the leading edge 28 of the broom head 15. Thus the tip 22 of the longest bristles extending out well past the leading edge 28 of the broom head 15. Thus the tip 22 can be more easily put into a corner. The cleaning of corners is also facilitated by the provision of handle 26 which is preferably integrally formed in the broom head 15 by means of an opening 24 which is preferably oblong and spaced about one inch inwardly from the adjacent leading edge of the broom head 15.

The longitudinal axis X-X of preferably oblong opening 26 is at an acute angle of about 25 to 45 degrees, and preferably about 35 degrees with respect to the lower edge 16. This angle makes it convenient for insertion of four fingers of a user's hand into the opening 24.

Figure 4:
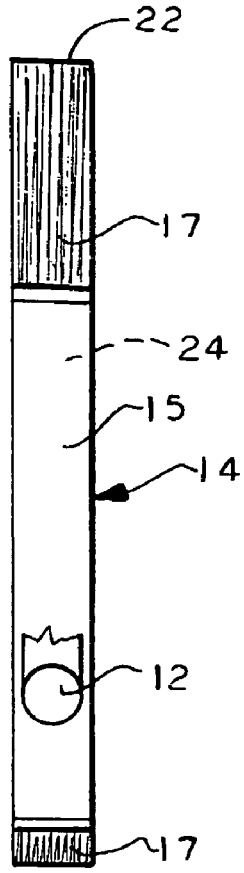
FIG. 4 is a top view of the broom head and broomstick shown in FIG. 1.

The broom head 15 is shaped so that the attachment point for the broomstick 12 is off center as shown in FIG. 4 and spaced away from the leading edge 28, thus, in effect, extending the leading edge 28 farther away from the user and making it easier for the user to be positioned between handle 26 and broomstick 12 when the handle 26 is used.

In addition to the advantage of the above described attachment point, the leading edge is also effectively extended by the broomstick projecting at an acute angle from the broom head 15. Longitudinal axis Y-Y of broomstick 12 is at an angle of about 60 to 85 degrees and preferably about 70 to 75 degrees with respect to lower edge 16.

Stated another way for greater clarity, assume that vertical line Z-Z in FIG. 1 passes through the center of broom head 15, that is at the mid-point between the leading and trailing edges thereof. Then, as shown in FIG. 1, broomstick 12 is located to the right of line Z-Z and opening 24 is located almost entirely to the left of line Z-Z. Thus a user who desired to grip both the handle 26 of the broom head 15 and the broomstick 12 would be in the area of line Z-Z. That user would have sufficient space in which to stand and then grip both the handle 26 and the broomstick or, alternatively could readily grip only handle 26 without the broomstick being in the way. As an alternative to the above described construction it is also contemplated that the area of the broom head 15 at handle 26 could be made thicker so that a hand grip with ridges and/or groves could be formed either in the molded plastic of the broom head 15 itself or by an auxiliary hand grip installed there over.

It is clear that the manner and mode of making broom head 26 and attachment and shape of the broomstick 12 may be varied, and that the particular mode described and/or illustrated is only by way of example of construction of a broom wherein the leading edge of the longer bristles may be spaced and controlled so as to effect desired cleaning of confined spaces.

What is claimed is:

1. A broom base connected to a broomstick comprising:

a broom [he] *head* for supporting a broom brush extending downwardly therefrom; said broom head having straight lower edges connecting a leading edge and a [Wailing] *trailing* edge, a vertical line positioned through the center of one of the straight edges and defining a first axis extending upwardly and perpendicular to the straight edges; broomstick support means for supporting a broomstick extending upwardly from said broom head, said broomstick support means being positioned on a trailing edge side of said vertical axis to support said broomstick, the broomstick defining a second axis at an [cute] *acute* angle and projecting away from said vertical axis; and to an oblong opening defined in the broom head, the opening being positioned at an angle to the straight edges, the opening defining a handle integral with said broom head, [the] the opening being positioned such that a major portion thereof is on opposite side of said vertical axis with respect to said broomstick support means.

2. The broom base of claim 1 in which said opening defines a longitudinal axis which lies at an acute angle with respect to said lower edges of said broom head.

3. The broom base of claim 2 in which said opening acute angle is between about 25 and 45 degrees.

4. The broom base of claim 1 in which said broom brush has a generally planar lower sweeping surface and the lower edges of said broom head are generally parallel thereto, the bristles of said broom brush being flared out so that a length of said sweeping surface is greater than a length of said lower edges of said broom head.

5. The broom [bas] *base* connected to a broomstick of claim 1, wherein the broom head is detachable from the broomstick.

6. The broom base connected to a broomstick of claim 1, wherein the axis of the broomstick is configured to intersect the straight lower edges between the vertical axis and the trailing edge.

7. A broom base connected to a broomstick comprising:

(a) a broom head for supporting a broom brush extending downwardly therefrom and means for supporting a broomstick extending upwardly therefrom, the broom head having straight lower edges, the broom stick defining an acute angle relative to the straight lower edges of the broom head;

(b) said broom head having a leading edge and a trailing edge, the leading edge and trailing edge being connected by said straight lower edges, an upwardly extending vertical axis defining a center line of the broom head perpendicular to the straight lower edges, an opening defined through said broom head; said opening being positioned adjacent said leading edge to define a handle portion positioned such that a major portion thereof is between said leading edge and the center line, said opening being integral with said broom head, the opening being oblong and defining a longitudinal axis, the longitudinal axis defining acute angle relative to the straight edges; and (c) said [room] *broom* brush comprising a plurality of bristles extending downwardly from said broom head across a width thereof with the bristles at said leading edge being longer than other bristles of said brush.

8. The broom base of claim 7 in which said opening acute angle is between 25 and 45 degrees.

9. The broom base of claim 7 in which said broomstick acute angle is between 60 and 85 degrees.

10. The broom base of claim 7 in which said broom brush has a generally planar lower sweeping surface and said lower edges of said broom head are generally parallel thereto, the bristles of said broom brush being flared out so that a length of said sweeping surface is greater than a length of said lower edges of said broom head.

11. The broom base connected to a broomstick of claim 7, wherein the broom head is detachable from the broomstick.

12. The broom base connected to a broomstick of claim 7, wherein the axis of the broomstick is configured to intersect the straight lower edges between the vertical axis and the trailing edge.

13. A broom comprising:

(a) a broom head having a leading edge, and a trailing edge, straight lower edges connecting the leading edge and the trailing edge, the broom head being configured for supporting a broom brush extending downwardly therefrom, a center line being positioned through the center of one of the lower edges and perpendicular to the lower edges of the broom head, the center line defining a leading edge side of the broom head and a trailing edge side of the broom head;

(b) a broomstick defining an axis extending upwardly from said broom head at an acute angle with respect to said lower edges the broomstick being positioned on the trailing edge side of the broom head;

(c) an [ob long] *oblong* opening defined through said broom head; said opening being positioned adjacent said leading edge to define a handle portion adapted for the positioning of four fingers and positioned such that a major portion thereof is between said leading edge and the center line and integral with said broom head, the oblong opening defining a longitudinal axis at an acute angle relative to the lower edges;

(d) said [room] *broom* brush comprising a plurality of bristles extending downwardly across a length of said broom head with the bristles at said leading edge being longer than other bristles across said length.

14. The broom of claim 13 in which said acute angle of the broomstick is between 60 and 85 degrees.

15. The broom of claim 13 in which said broom brush has a generally planar lower sweeping surface and said lower edges of said broom head are generally parallel thereto, the bristles of said broom brush being flared out so that a length of said sweeping surface is greater than a length of said lower edges of said broom head.

16. The broom of claim 13, wherein the broom head is detachable from the broomstick.

17. The broom of claim 13, wherein the broomstick axis being configured to intersect the straight lower edges between the center line and the trailing edge.

*18. A broom base connected to a broomstick comprising:*

*a broom head for supporting a broom brush extending downwardly therefrom, said broom head having lower edges connecting a leading edge and a trailing edge;*

*a vertical line positioned through the center of one of said lower edges and defining a first axis intersecting said lower edges and extending upwardly and perpendicular to said lower edges;*

*an angled line extending upwardly from one of said lower edges at an acute angle with respect to said trailing edge, said angled line defining a second axis;*

*broomstick support means for supporting a broomstick extending upwardly along said second axis from said broom head, whereby an area is defined in said broom head extending from said lower edges to said broomstick support means;*

*an oblong opening in said broom head, the oblong opening being positioned such that a major portion of the oblong opening is on one side of said broom head with respect to said first axis and said broomstick support means, the oblong opening being positioned at an angle with respect to the lower edges; and*

*the oblong opening being positioned near an upper peripheral edge of the broom head forming a narrow handle along a perimeter of said upper edge of said broom head, said narrow handle being defined by the portion of the broom head between the upper peripheral edge of the broom head and said oblong opening with the width of the narrow handle at a middle portion of the oblong opening being less than the width thereof at the portion of the oblong opening near the leading edge and adjacent the lower edges of the broom head, whereby the narrow handle allows a user to easily grasp the broom head with four fingers.*

*19. The broom of claim 18, wherein the broom head is detachable from the broomstick.*

*20. The broom of claim 18, wherein the broom head is made of molded plastic material.*

*21. The broom of claim 18, wherein the sweeping surface is about fifty percent longer than the length of the lower edge.*

* * * * *